United States Patent
Mathews

(10) Patent No.: US 6,170,188 B1
(45) Date of Patent: *Jan. 9, 2001

(54) APPARATUS FOR ATTRACTING WATERFOWL

(76) Inventor: Robert F. Mathews, 8800 Mathews La., Marysville, CA (US) 95901

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/273,875

(22) Filed: Mar. 22, 1999

(51) Int. Cl.[7] ................................................. A01M 31/06
(52) U.S. Cl. ........................................................... 43/3
(58) Field of Search ............................ 43/2, 3, 26.1, 26.2

(56) References Cited

U.S. PATENT DOCUMENTS

| | | | |
|---|---|---|---|
| 282,851 | * | 8/1883 | Danz, Jr. ................................. 43/3 |
| 843,588 | * | 2/1907 | Ditto ....................................... 43/3 |
| 2,229,175 | * | 1/1941 | Johnson ................................... 43/3 |
| 2,575,252 | * | 11/1951 | Berger ..................................... 43/3 |
| 2,576,209 | * | 11/1951 | Berger ..................................... 43/3 |
| 2,692,451 | * | 10/1954 | Deuster ................................... 43/3 |
| 4,620,385 | | 11/1986 | Carranza et al. ........................ 43/3 |
| 4,896,448 | | 1/1990 | Jackson ................................... 43/3 |
| 5,003,722 | | 4/1991 | Berkley et al. .......................... 43/3 |
| 5,105,573 | * | 4/1992 | Mays .................................. 43/26.2 |
| 5,144,764 | | 9/1992 | Peterson ................................. 43/3 |
| 5,231,780 | | 8/1993 | Gazalski ................................. 43/3 |
| 5,459,958 | * | 10/1995 | Reinke ................................... 43/2 |
| 5,636,466 | | 6/1997 | Davis ..................................... 43/3 |
| 5,809,683 | | 9/1998 | Solomon ................................. 43/3 |
| 5,862,619 | | 1/1999 | Stancil ................................... 43/3 |
| 5,884,427 | * | 3/1999 | Lenz ...................................... 43/2 |
| 5,930,969 | * | 8/1999 | Parr et al. .............................. 43/3 |
| 5,974,720 | * | 11/1999 | Bowling ................................. 43/3 |
| 6,092,323 | * | 7/2000 | McBride et al. ........................ 43/3 |

* cited by examiner

Primary Examiner—Darren W. Ark
(74) Attorney, Agent, or Firm—Michael I. Kroll

(57) ABSTRACT

Waterfowl decoy apparatus includes a decoy housing, a pair of decoy wing members rotatably connected to the decoy housing and an elongated stand supporting the housing to position the decoy housing over the surface of a body of water. The apparatus may be readily converted between wind powered operation and motor powered operation.

6 Claims, 4 Drawing Sheets

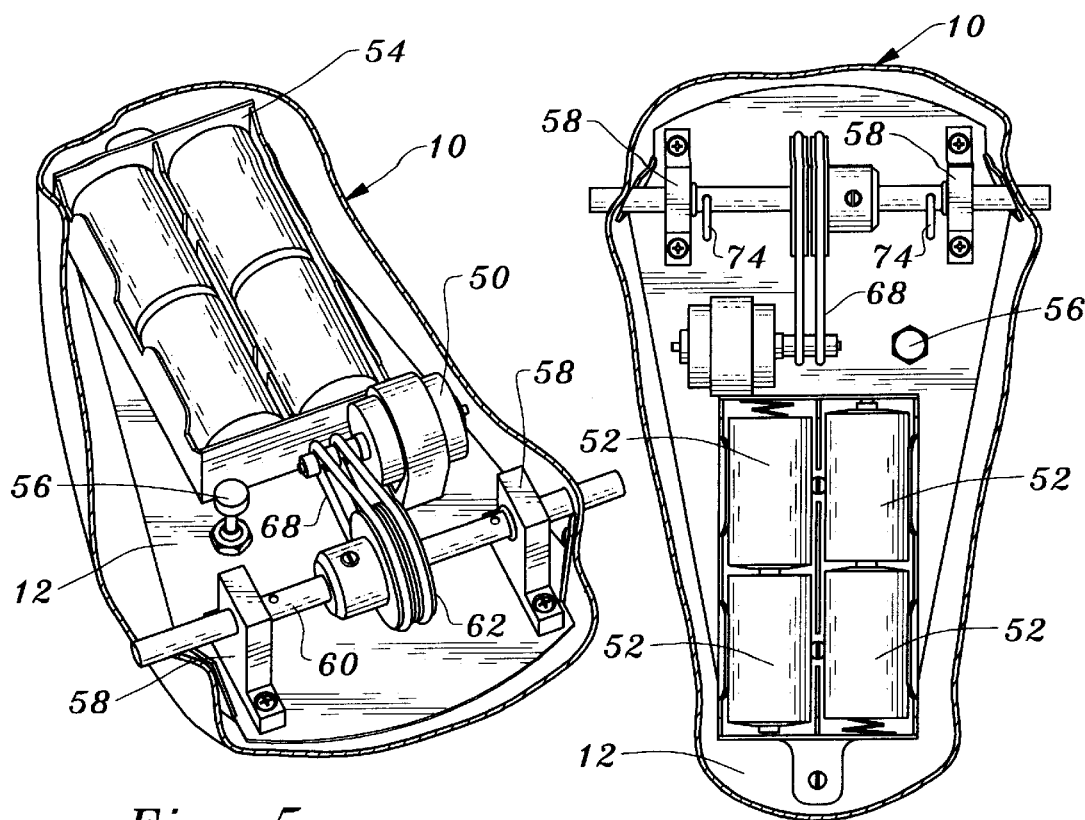
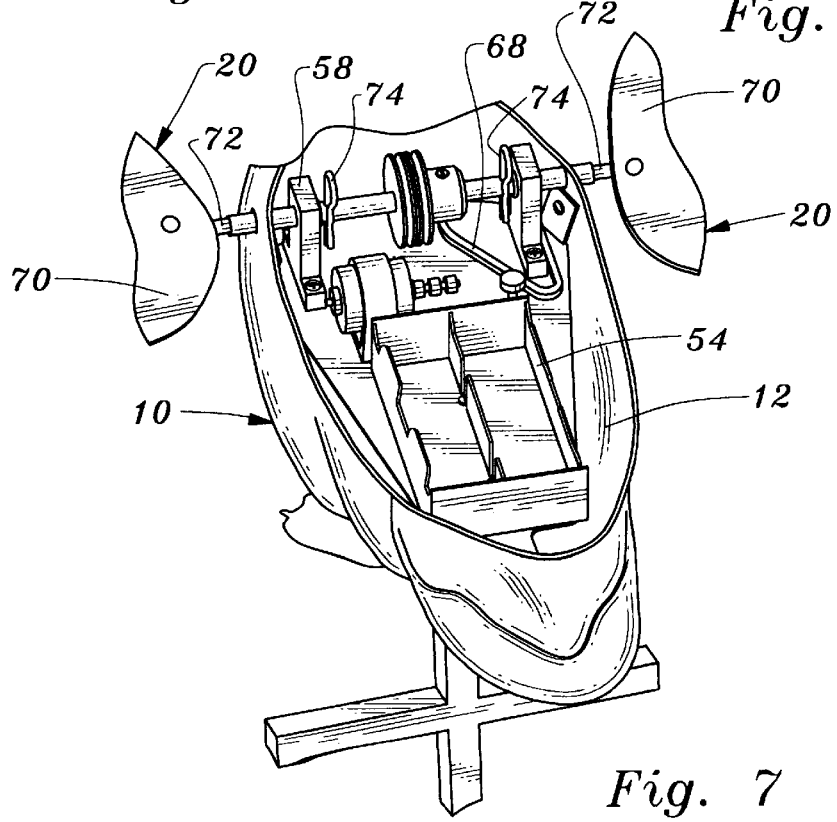

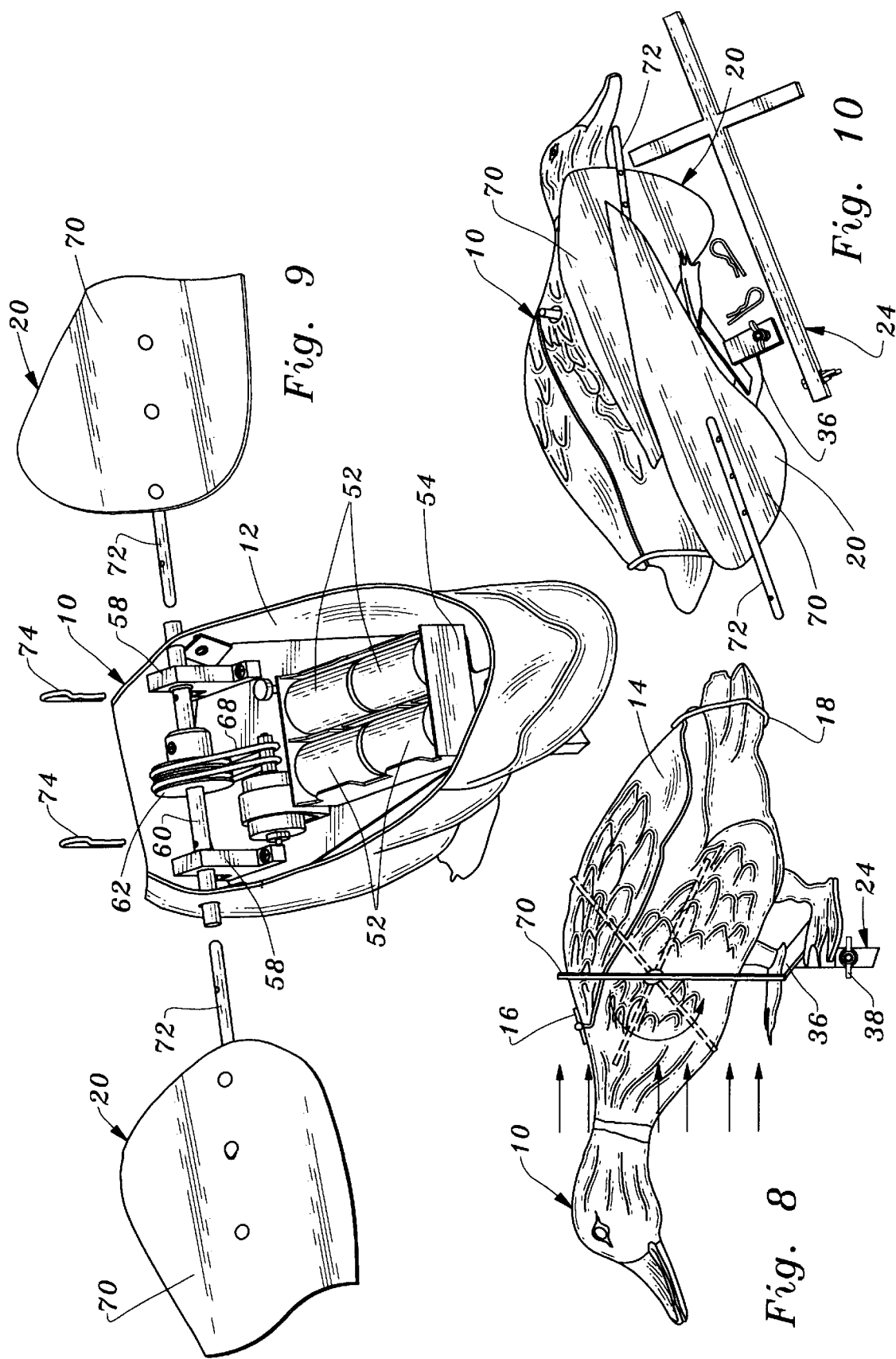

APPARATUS FOR ATTRACTING WATERFOWL

TECHNICAL FIELD

This invention relates to waterfowl decoy apparatus which is for the purpose of attracting waterfowl to a particular location. The apparatus incorporates movable wings and has particular application to installation at a water site. It can also be deployed at a land site. The principles of the invention can also be applied to apparatus simulating other types of birds, such as replicas of owls employed to ward off pigeons or other pests.

BACKGROUND OF THE INVENTION

The use of decoys to attract waterfowl is an ancient practice. Typically, prior art decoys float on the surface of a body of water.

A relatively recent development in the art of waterfowl decoys has been to provide some means for moving all or part of the decoy, the objective being to provide a decoy which appears more natural to waterfowl such as ducks or geese.

U.S. Pat. No. 5,809,683, issued Sep. 22, 1998, discloses a battery powered apparatus to provide movable wings and feet on waterfowl decoys. The decoy floats on the surface of the water and incorporates wings which move back and forth.

U.S. Pat. No. 4,896,448, issued Jan. 30, 1990, discloses a bird decoy including a body and a flapping mechanism mounted therein moving a pair of wings which oscillate with respect to the body. The bird decoy is for positioning on the surface of a body of water.

U.S. Pat. No. 4,620,385, issued Nov. 4, 1986, discloses a waterfowl decoy which incorporates a pair of rotatable wings slidably and rotatably received and secured on the axle of a bracket carried by the waterfowl decoy. The wings rotate when subjected to a breeze.

U.S. Pat. No. 5,003,722, issued Apr. 2, 1991, discloses a game bird decoy cut from flexible sheet plastic foam material and mounted on a pole to simulate the silhouette of a bird approaching landing on water or land.

U.S. Pat. No. 5,231,780, issued Aug. 3, 1993, discloses a plastic shelled game bird decoy operable through a cord, wire, rope or the like to cause wing flapping or flagging movement.

U.S. Pat. No. 5,144,764, issued Sep. 8, 1992, discloses a decoy with a pair of flexible wings which fluctuate in a flapping action in response to air flow over the wings.

U.S. Pat. No. 5,636,466, issued Jun. 10, 1997, discloses an animal decoy apparatus including radio controlled upper appendages. In the case where the animal is a waterfowl, the appendages simulate wings.

U.S. Pat. No. 5,862,619, issued Jan. 26, 1999, discloses an animated decoy wherein the appearance of symmetrical lateral movement such as the flapping of a bird's wings is provided by a rotating vane which has a light side and a dark side. The patent suggests possible use of a motor to rotate the vane.

DISCLOSURE OF INVENTION

The present invention relates to a waterfowl decoy apparatus incorporating a unique combination of structural elements which cooperate in a unique manner to provide a highly effective attractant to flying waterfowl, such as ducks or geese.

The apparatus provides for positioning of the decoy per se above the surface of a body of water so that damage to the decoy housing and mechanism employed therein is minimized. The animation of the decoy provides a display which attracts waterfowl to the location of the apparatus, the display being caused by rotating wings and water motion at the surface of the body of water where the apparatus is positioned. The apparatus is capable of being powered either by an electric motor or by the force of wind.

The apparatus may be readily broken down into individual structural components thereof for shipping or storage purposes.

The waterfowl decoy apparatus of the present invention includes a decoy housing having the configuration of a waterfowl's body and defining a housing interior.

Decoy wing members are rotatably connected to the decoy housing and extend outwardly from opposed sides of the decoy housing.

An electric motor is disposed within the housing interior along with a transmission means for operatively interconnecting the electric motor to the pair of decoy wing members.

Electric battery means is operatively associated with the electric motor to energize and cause operation of the electric motor. The transmission means, when operatively interconnecting the electric motor to the decoy wing members, causes rotation of the decoy wing members responsive to energization and operation of the electric motor.

The waterfowl decoy apparatus also includes an elongated support stand connected to the decoy housing and extending downwardly therefrom. The elongated support stand has a lower distal end for positioning in the earth under a body of water to support the decoy housing above the surface of the body of water.

Other features, advantages, and objects of the present invention will become apparent with reference to the following description and accompanying drawings.

BRIEF DESCRIPTION OF DRAWINGS

FIG. 5 is a partial, sectional, perspective view illustrating selected components disposed within the interior of the decoy housing as seen from the front;

FIG. 6 is a partial, sectional, top view illustrating the components within the housing interior, the rear end of the housing being disposed downwardly in FIG. 6;

FIG. 7 is a partial, sectional, perspective view illustrating the components of the interior of the housing with batteries removed and a drive belt in the position assumed thereby when operatively disengaged to permit movement of the wing members by wind;

FIG. 8 is a side, elevational view illustrating the decoy housing oriented head-first into wind, the wind rotating the wing members;

FIG. 9 is a partial, sectional, exploded, top, perspective view illustrating assembly of selected structural components of the apparatus; and FIG. 10 is a perspective view illustrating the waterfowl decoy apparatus broken down into its individual components for shipping or storage purposes.

BEST MODE FOR CARRYING OUT THE INVENTION

Figure 2:
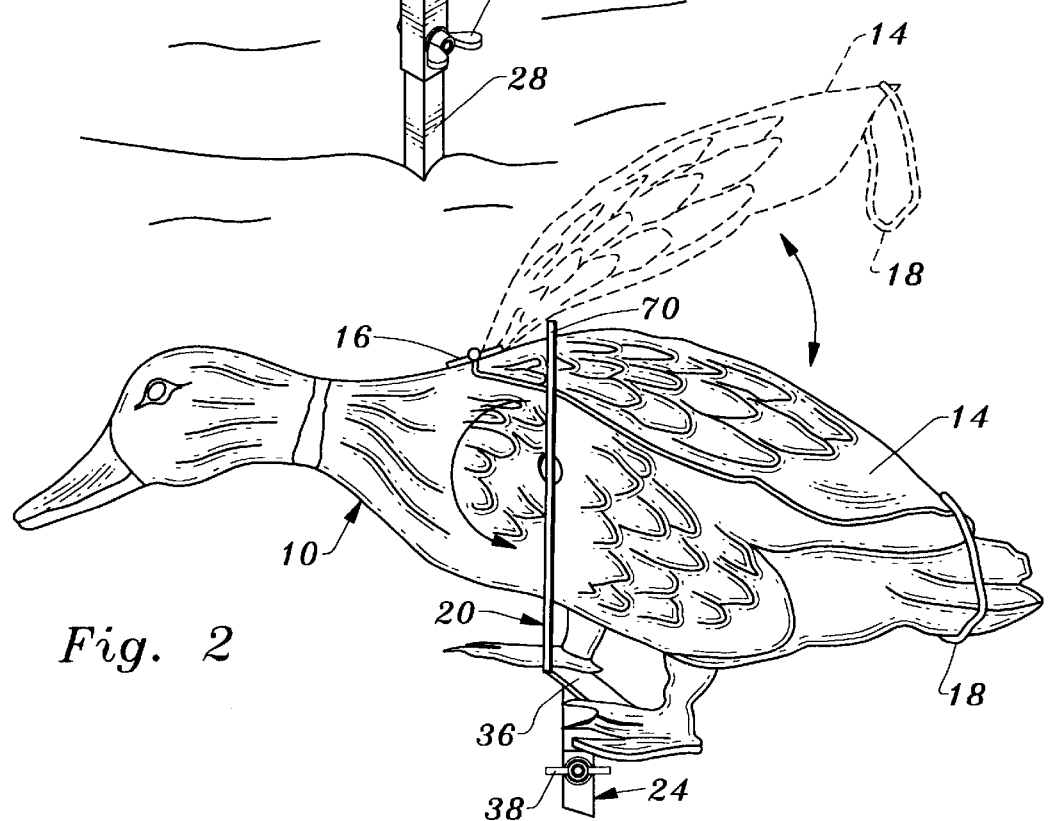
FIG. 2 is a side, elevational view of an upper portion of the apparatus and illustrating movement of a cover employed in the decoy housing movable between open and closed positions.
Figure 3:
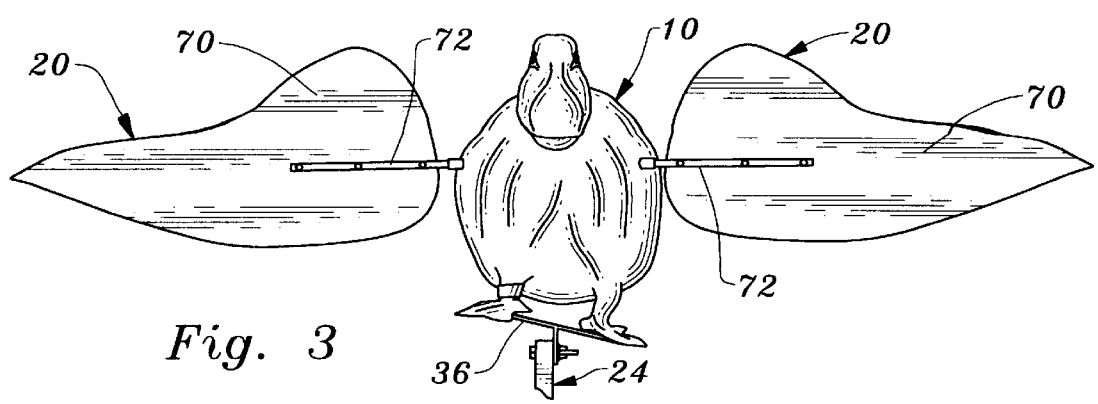
FIG. 3 is a frontal, elevational view of an upper portion of the apparatus.
Figure 4:
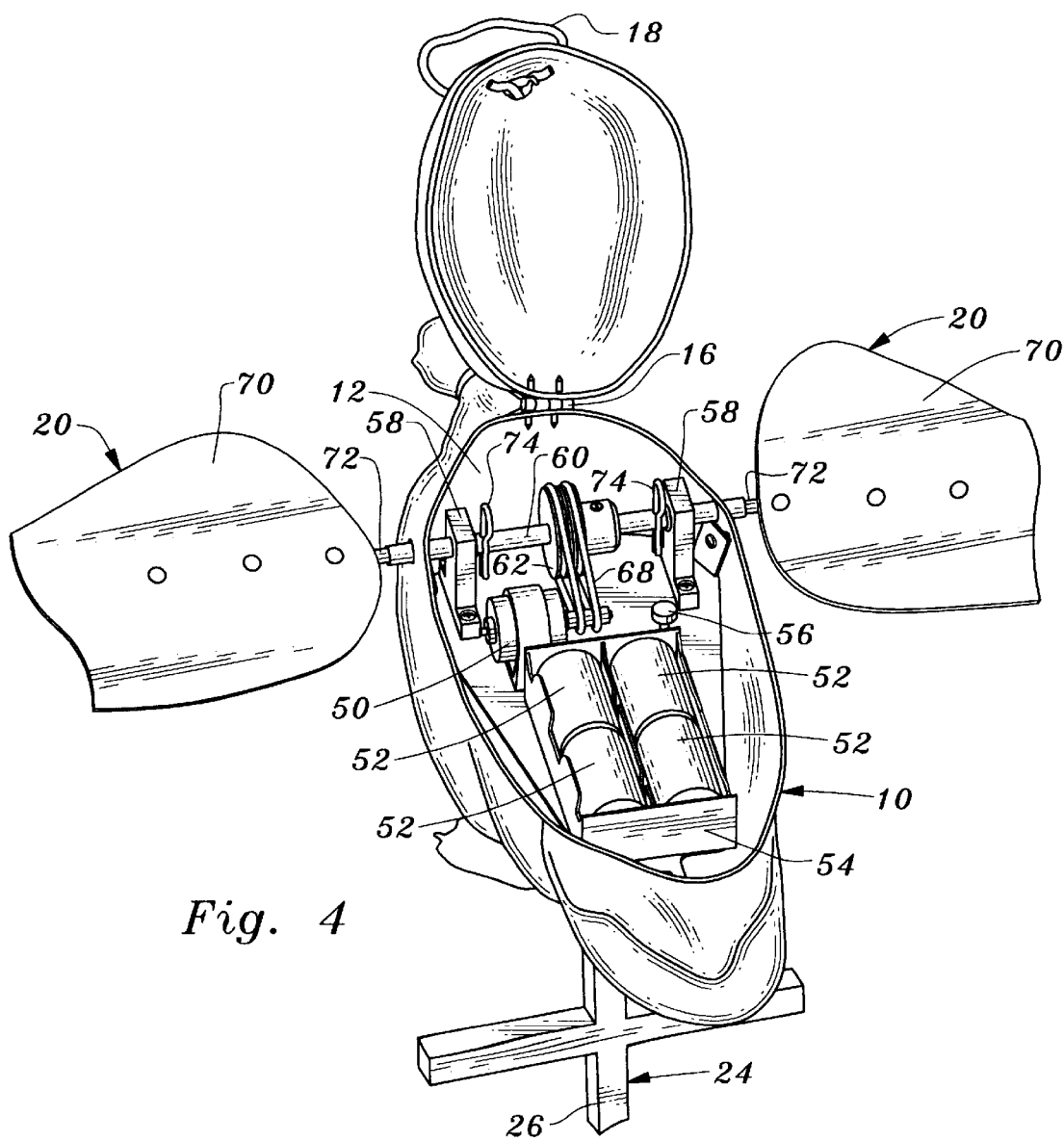
FIG. 4 is a partial, perspective view illustrating the cover of the decoy housing in open position to disclose the contents of the housing interior.

Referring now to the drawings, waterfowl decoy apparatus constructed in accordance with the present invention includes a decoy housing 10 having the configuration of a waterfowl's body and defining a housing interior 12. The decoy housing may be constructed of any suitable material such as plastic or fiberglass and includes a cover portion 14 connected to the rest of the decoy housing by a hinge 16 and movable between a closed position wherein the housing interior is closed by the cover portion as shown in solid lines in FIG. 2, for example, and an open position wherein the housing interior is exposed for access by an individual. In FIG. 2, the open position is shown by a dash line representation of the cover portion. Any suitable means such as an elastic band 18 may be employed to releasably retain the cover portion closed. As shown in the drawings, the housing has a housing top simulating a complete bird body top, a head end, a tail end and a longitudinal axis extending between the head end and the tail end.

A pair of decoy wing members 20 are rotatably connected to the decoy housing and extend outwardly from opposed sides of the decoy housing laterally of the longitudinal axis of the decoy housing. The structure of the decoy wing members and their cooperative relationship with other structural elements of the apparatus will be discussed in detail below.

The waterfowl decoy apparatus includes an elongated support stand 24 connected to the decoy housing 10 and extending downwardly therefrom. The elongated support stand may be formed of any suitable material such as metal, for example steel or aluminum, or plastic.

Support stand 24 includes telescoping elongated support stand members 26, 28 which are relatively movable with respect to one another and locked against movement when the support stand is the desired length by any suitable expedient such as connector 30. Connector 30 includes a bolt and wing nut, the bolt passing through aligned apertures (not shown) in the support stand members to provide the desired support stand length.

Figure 1:
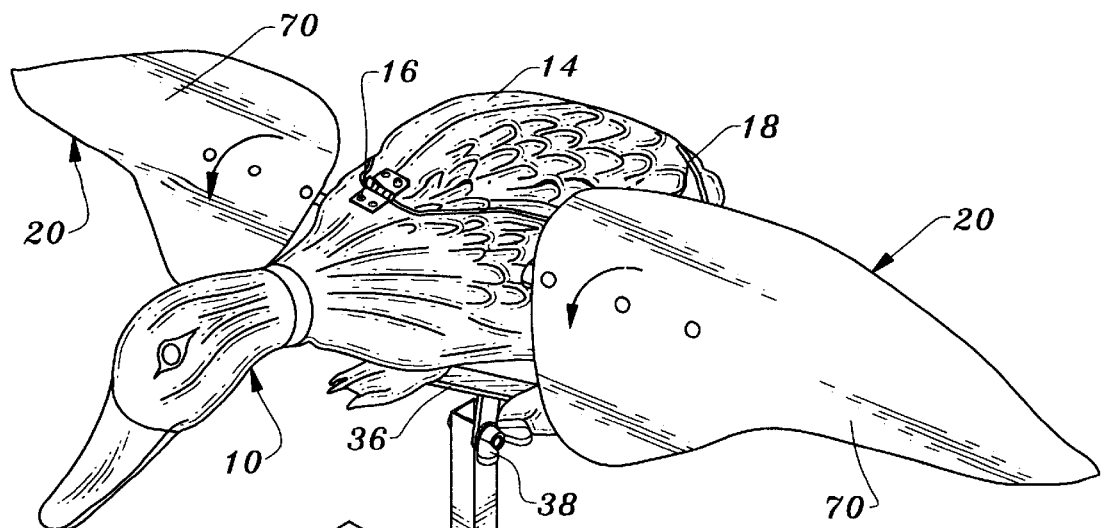
FIG. 1 is a frontal, perspective view illustrating the waterfowl decoy apparatus of the present invention in position at a body of water.

The elongated support stand 24 has a lower distal end for positioning in the earth under a body of water to support the decoy housing above the surface of the body of water. This situation is shown in FIG. 1. The support stand 24 includes handle members 32 for manual grasp by an individual to facilitate positioning of the elongated support stand in the earth and removal of the elongated support stand from the earth.

The elongated support stand has sufficient flexibility to vibrate in response to rotation of the decoy wing members 20 to agitate the surface of the body of water. This contributes to the ability of the apparatus to attract waterfowl. Further, water movement will be caused by air movement resulting from powered rotation of the decoy wing members 20. The entire housing top and the rotating bird wing members are observable by a waterfowl flying above the elongated support stand and housing.

Adjustable connector means adjustably connects the elongated support stand 24 to decoy housing 10 so that the orientation of the decoy housing relative to the elongated support stand can be selectively varied. In particular, a bracket 36 is positioned directly beneath and attached to the feet of the decoy housing by any suitable fastener means. A wing nut/bolt connector 38 is employed to maintain the desired angular orientation.

Disposed in the housing interior is an electric motor 50 which is powered by batteries 52 positioned in a battery holder 54. A switch 56 is employed in a circuit with the batteries and the electric motor to energize or deenergize the electric motor in a conventional manner. Switch 56 can be a conventional timer switch which will allow either constant or intermittent motor operation.

Disposed adjacent to motor 50 are support bearings 58 having a rotatable decoy wing member support in the form of a shaft 60 rotatably journaled therein. A drive pulley 62 is affixed to the shaft 60 and rotatable therewith. A drive belt 68 extends between drive pulley 62 and the motor output shaft.

Each wing member 20 includes a wing 70 and a mounting shaft 72 extending from the wing and secured thereto in any desired fashion. The wing has the general configuration of a waterfowl wing and preferably has a different color scheme on the front and back thereof.

The mounting shafts 72 are inserted into recesses formed in the ends of shaft 60. See in this connection FIG. 9. The mounting shafts 72 are secured in place by cotter pins 74 which are placed in aligned holes formed in the shaft 60 and mounting shafts 72.

When the wing members are secured in place by the cotter pins 74 and the batteries 52 are in place, actuation of the switch 56 will result in energization of the motor 50 and rotation of shaft 60 and the wing members to present an attractive display to flying waterfowl. Also, as mentioned above, movement of the wings will serve to cause a certain amount of agitation of the water surface if the wings are disposed relatively close thereto.

If desired, the apparatus can be readily converted to wind power use. This is accomplished as shown in FIG. 7 by moving the drive belt 68 out of operative engagement with the pulley 62 and electric motor. The wings 70 are suitably configured using known aerodynamic principles to allow rotation of the wing members by the wind as shown in FIG. 8.

The apparatus can be readily partially disassembled so that primary structural components thereof are separate as shown in FIG. 10. This allows the apparatus to be stored and/or shipped in a smaller container than would be the case if the assembled apparatus were involved. It should also be noted with reference to FIG. 10 that the support stand members are completely telescoped to reduce the overall size of the support stand during storage and shipment.

Modifications can be made to the apparatus if desired. For example, the apparatus can be employed with conventional equipment allowing remote on/off control.

What is claimed is:

1. An animated bird replica apparatus employable as a decoy, said apparatus comprising, in combination:

a housing having the configuration of a bird's body having a housing top simulating a substantially complete bird body top, a head end, a tail end and a longitudinal axis extending between said head end and said tail end, said housing defining a housing interior;

a pair of bird wing members rotatably connected to said housing between said head end and said tail end, extending outwardly from opposed sides of said housing laterally of said longitudinal axis and fully rotatable about a common axis of rotation extending laterally of said longitudinal axis;

an electric motor disposed within said housing interior;

transmission means disposed within said housing interior for operatively interconnecting said electric motor to said pair of bird wing members, said transmission means includes a rotatable bird wing member support within said housing interior extending between, connected to and supporting said bird wing members, said wing members including wings and mounting shafts extending from said wings, and releasable connector means releasably connecting said bird wing member mounting shafts to opposed ends of said rotatable bird wing member support, wherein said bird wing member mounting shafts are received within said rotatable bird wing member support and said releasable connector means comprise cotter pins with portions extending through said rotatable bird wing member support and each of said bird wing member mounting shafts;

electric battery means operatively associated with said electric motor to energize and cause operation of said electric motor, said transmission means operatively interconnecting said electric motor to said pair of bird wing members causing rotation of said bird wing members responsive to energization and operation of said electric motor; and means for supporting said housing above and out of direct contact with a body of water such as to agitate the surface of the body of water in the immediate vicinity of the animated bird replica when said bird wing members are being rotated comprising an elongated support stand connected to said housing and extending downwardly therefrom, said elongated support stand having a lower distal end for positioning in the earth under the body of water and of sufficient length to support said housing and said bird wing members above the surface of the body of water, said elongated support stand having sufficient flexibility to vibrate in response to rotation of said bird wing members to agitate the surface of the body of the water in the immediate vicinity of the animated bird replica apparatus, and said elongated support stand supporting said housing when said elongated support stand is positioned in the earth under the body of water with the entire housing top oriented upwardly and the entire housing top and the bird wing members being observable from a location over said elongated support stand and said housing.

2. The animated bird replica apparatus according to claim 1 wherein said elongated support stand includes at least two elongated relatively movable support stand members for varying the effective length of said elongated support stand and lock means for selectively locking said support stand members against relative movement.

3. The animated bird replica apparatus according to claim 1 additionally including adjustable connector means adjustably and releasably connecting said elongated support stand to said housing whereby the orientation of said housing relative to said elongated support stand can be selectively varied.

4. The animated bird replica apparatus according to claim 1 additionally comprising one handle member protecting laterally from said elongated support stand for manual grasp by an individual to facilitate positioning of the elongated support stand in the earth and removal of the elongated support stand from the earth.

5. The animated bird replica apparatus according to claim 1 wherein said transmission means is selectively adjustable to terminate operative interconnection between said electric motor and said pair of bird wing members and allow said pair of bird wing members to fully rotate responsive to the impact of wind thereon without said electric motor exerting a drag force impeding rotation.

6. The method of attracting waterfowl to a particular location comprising the steps of:

using a flexible mounting to support above and out of contact with the surface of a body of water an animated bird replica apparatus comprising a housing having the configuration of a bird's body with a pair of bird wing members configured to allow rotation by wind rotatably connected to said housing extending outwardly from opposed sides of said housing and fully rotatable about a common axis of rotation, said housing containing means for energizing said bird wing members to rotate comprising an electric motor and transmission means for operatively interconnecting said electric motor to said pair of bird wing members, and electric battery means operatively associated with said electric motor to energize and cause operation of said electric motor, said flexible mounting extending down to earth under said body of water;

activating said energizing means to rotate said bird wing members such as to agitate the surface of the body of water in the immediate vicinity of the animated bird replica as a result of the flexible mounting and disturbance of air by rotation of said wing members; and selectively deactivating said energizing means to convert said animated bird replica apparatus to wind power use for agitating the water underneath.

\* \* \* \* \*